(12) United States Patent
Blais et al.

(10) Patent No.: US 6,609,902 B1
(45) Date of Patent: Aug. 26, 2003

(54) INJECTION MOLDING NOZZLE

(75) Inventors: Paul Richard Blais, South Burlington, VT (US); Stephen J. Cernava, St. Albans, VT (US); Fadi Fikani, Burlington, VT (US)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 10/292,739

(22) Filed: Nov. 12, 2002

(51) Int. Cl.⁷ ............................................... B29C 45/20
(52) U.S. Cl. ................................. 425/549; 264/328.15
(58) Field of Search ................................ 425/549, 564, 425/563, 562, 565, 566; 264/328.15

(56) References Cited

U.S. PATENT DOCUMENTS

| 5,208,052 A | 5/1993 | Schmidt et al. |
|---|---|---|
| 5,299,928 A | 4/1994 | Gellert |
| 5,879,727 A | 3/1999 | Puri |
| 5,885,628 A | 3/1999 | Swenson et al. |
| 6,164,954 A | 12/2000 | Mortazavi |
| 6,302,680 B1 | 10/2001 | Gellert et al. |
| 6,343,922 B1 * | 2/2002 | Kazmer et al. ............. 425/564 |
| 6,394,785 B1 | 5/2002 | Ciccone |

\* cited by examiner

*Primary Examiner*—Tim Heitbrink
(74) *Attorney, Agent, or Firm*—Steven J. Kotula

(57) ABSTRACT

A nozzle for an injection molding runner system comprises a nozzle housing having a melt channel through it, a nozzle tip having a tip channel and at least one outlet aperture in communication with the tip channel, and a tip retainer that retains the nozzle tip against the nozzle housing such that the tip channel communicates with the melt channel. The tip retainer is significantly more thermally conductive than the nozzle tip. A nozzle seal that is significantly less thermally conductive than the tip retainer may be fused with the tip retainer, and may be annularly spaced from the nozzle tip.

20 Claims, 4 Drawing Sheets

INJECTION MOLDING NOZZLE

BACKGROUND OF THE INVENTION

1. Field of the Invention

The present invention relates, generally, to injection molding systems, and more particularly, but not exclusively, the invention relates to hot tips of nozzles for hot-runners, particularly nozzles where a tip insert is secured by a separate retainer piece.

2. Background Information

The state of the art includes various nozzles and tips for hot runner injection molding systems. Hot-runner nozzles are typically either a valve-gate style or a hot-tip style. In the valve-gate style, a separate stem moves inside the nozzle and tip acting as a valve to selectively start and stop the flow of resin through the nozzle. In the hot-tip style, a small gate area at the end of the tip freezes off to thereby stop the flow of resin through the nozzle. The present invention applies to the hot-tip style nozzles.

An injection molding system using a hot-tip style nozzle typically has a cooled mold with a small circular gate opening in which the tip of the nozzle is inserted. The tip is typically conical with a tapered point. In operation, the tapered point is positioned in the circular gate to thereby form an annular opening through which molten plastic is then transferred from the nozzle to the mold. When the mold is full, plastic flow stops. In an ideal molding cycle, the mold is typically cooled so that the plastic injected into it soon solidifies. As the liquid plastic in the mold cools it shrinks, which continues to allow plastic from the nozzle to move into the mold. This step is referred to as "packing". The nozzle is typically heated so that the molten plastic contained within it remains liquid. The hot plastic moving through the gate area during packing keeps the gate area from freezing until all the plastic in the part has solidified. Eventually the gate freezes, the mold is opened, and the part is ejected, thereby breaking the small amount of frozen plastic at the gate area.

If the mold is opened before the gate has frozen, the plastic will string from the nozzle to the mold. This is known as a "gate stringing" and is unacceptable because the plastic string must be removed from the part in a subsequent operation, or the part scrapped. Waiting a long time for the gate to freeze is also unacceptable because it adds time to the molding cycle, which is desired to be as short as possible to optimize system productivity.

If the nozzle does not provide enough heat at the tip to keep the gate from freezing before the part is fully injected and packed, the part may have voids or other quality problems making it unacceptable.

In the prior art, direct heating of the nozzle tip is not practical because of the small size of the nozzle tip. Consequently, the nozzle tip must be heated through a conduction process reliant upon the conductivity of the materials in the entire nozzle. Heat is applied to the nozzle body by well-known techniques and is conducted to the nozzle tip. The tip material is, therefore, made of high-conductivity material that promotes the flow of heat to the nozzle tip.

It is important that the nozzle tip provide the right amount of heat at the gate area to keep the plastic in a liquid state as it flows through the gate, but also that it allows the plastic to freeze in a reasonable time when flow has stopped. The tip must also resist corrosion, sustain compressive loads from injection pressures that may reach 40,000 psi, (275 Mpa) or higher, and resist wear when used with plastics containing fillers such as glass or other particulate materials. Since tips can wear out, it is desirable that they be easily replaceable. It is also desirable that tips be easily changed to process different materials.

To address those needs, two-piece tip assemblies have become commonplace. A removable tip insert is secured in the nozzle housing by a tip retainer that typically threadably engages the nozzle housing. The relatively inexpensive tip insert can easily be changed by unscrewing the retainer, installing another tip insert, and reattaching the retainer. Such tip arrangements are cost-effective because the retainer is not replaced.

The two-piece tip assemblies include a nozzle seal that is attached to the retainer portion. Since the nozzle seal contacts the mold, which is cold relative to the nozzle tip, it is preferable that the nozzle seal material has low thermal conductivity so that heat from the nozzle and nozzle tip is not transmitted into the mold through the nozzle seal.

These requirements have resulted in several US patents on a variety of tip and nozzle seal arrangements that use a tip insert and a retainer, and they all teach the use of a highly thermally conductive material for the tip insert.

U.S. Pat. No. 5,208,052 to Schmidt et al. teaches a tip insert made from beryllium copper, having a high thermal conductivity, and a retainer made from titanium alloy having low thermal conductivity.

U.S. Pat. No. 5,299,928 to Gellert also teaches an inner piece of the tip formed of a highly thermally conductive material, such as beryllium copper alloy, and the outer retaining piece formed of a material such as titanium alloy which is much less thermally conductive than the beryllium copper tip insert.

Likewise, U.S. Pat. No. 5,885,628 to Swenson et al. teaches an inner piece of the tip constructed of a highly conductive material, such as beryllium copper, and an outer piece preferably formed of a low thermally conductive material, such as titanium alloy.

U.S. Pat. No. 6,394,785 to Ciccone also discloses a nozzle tip insert normally made of beryllium copper.

For more wear-resistant tips, U.S. Pat. No. 6,302,680 to Gellert et al. discloses a tip insert made of a material, such as beryllium copper or tungsten carbide copper, having a combination of thermal conductivity and wear and corrosion resistance suitable for the material being molded. The nozzle seal, which also retains the tip insert, is made of suitable wear and corrosion resistant material, such as stainless or H-13 tool steel. U.S. Pat. No. 6,164,954 to Mortazavi et al. also discloses the use of materials for the tip insert that exhibit high wear resistance and good thermal conductivity, such as carbide and tungsten carbide. Mortazavi also discloses the use of materials for the retainer that have good thermal conductivity, such as Ti/Zr-carbide.

U.S. Pat. No. 5,879,727 to Puri discloses a nozzle tip preferably made of a material with a relatively high thermal conductivity, such as copper-based alloys. The tip threadably attaches to the nozzle, and a seal ring, made of relatively high wear resistant material such as H-13, 4140 or P-20 tooling metals, attaches to the tip it through an insulator made of a low thermally conductive material such as titanium, All of these nozzle tips function in essentially the same way, using the high thermal conductivity of the tip insert to conduct heat from the heated nozzle body to the gate area. The heat from the nozzle tip opens the gate at the beginning of the injection cycle and keeps it open during the injection process, and cooling from the mold cools and eventually freezes the gate after packing is complete. If the tip is not hot enough, the gate may not open and injection will not occur, or the gate will freeze too soon causing poor-quality parts. If too much heat is transferred to the tip, the gate will not freeze, resulting in stringing gates. Therefore, for any particular nozzle tip and resin there is an operating temperature window between the minimum temperature needed to get the gate open and keep it open as desired through the molding process, and the maximum temperature at which parts can be made without stringing gates. If the operating window is narrow, it may be difficult for molds with multiple cavities to consistently make good parts in all cavities because of the many variables associated with the injection molding process. One factor is assembly tolerance stack up that varies tip heights in the gate. Since the tip is conical, variations in tip height cause variations in the size of the annulus between the tip and the gate through which molten plastic flows. Another factor is variation in temperature of the resin from the nozzle to nozzle due to heat loss at various portions in the hot runner, or from flow imbalance in the hot runner.

Furthermore, resins have melt flow characteristics and an optimum temperature range for processing that determines what processing parameters are used in the injection molding process. The flow characteristic for a resin inherently varies from batch to batch. To keep resin costs down and to preclude sorting resin by batch, molders often purchase resins in large quantities with a specification allowing a large range for flow characteristic. One batch of resin may run adequately for a given set of processing parameters, but the next batch, having a different flow characteristic, may not produce good parts using exactly the same process settings.

In many injection molding systems, the temperature of the nozzle is often monitored, typically near the tip, with a thermocouple. This measures the temperature of the metal in the nozzle, and not the actual temperature of the molten resin. There is a loop feedback arrangement between the thermocouple and the nozzle heater to typically keep the nozzle temperature, as measured by the thermocouple, at a fixed setpoint. On some systems, the temperature of each individual nozzle can be adjusted as necessary to compensate for the above variations, but on many systems such individual control of the nozzle heaters is not possible. Still on other systems, the nozzle temperature is not monitored. Based on process experiments, these systems rely on power control settings, typically some percentage of maximum available power, to determine the operating temperature of the nozzle. With any system, however, it is unfortunately possible to have one nozzle operating at the upper limit of the operating window, and another nozzle operating at the lower limit. Or, if the window is too narrow, some nozzles may always be outside of the window, thereby preventing the mold from producing good parts in all cavities.

There is a need for an injection molding nozzle tip which provides a wider operating window than those of the prior art.

SUMMARY OF THE INVENTION

The present invention provides a nozzle for an injection molding runner system. The nozzle comprises a nozzle housing having a melt channel through it, a nozzle tip having a tip channel and at least one outlet aperture in communication with the tip channel, and a tip retainer that retains the nozzle tip against the nozzle housing such that the tip channel communicates with the melt channel. The tip retainer is significantly more thermally conductive than the nozzle tip.

In one embodiment, the nozzle includes a nozzle seal that is significantly less thermally conductive than the tip retainer. The nozzle seal may be fused with the tip retainer, and may be annularly spaced from the nozzle tip.

In one embodiment, the tip retainer is removably affixed to the nozzle housing by threads. In another embodiment, the tip retainer is removably affixed to the nozzle housing by low-temperature brazing. In yet another embodiment, the nozzle tip is retained in the tip retainer by low-temperature brazing.

Advantageously, the present invention provides a nozzle tip having a large operating window that permits the production of high quality parts even in the face of large variations in resin temperature, tip height and resin flow characteristic. The nozzle tip of the preferred embodiment of the present invention also beneficially avoids having to adjust nozzle temperatures.

The features benefits and objects of this invention will become clear to those skilled in the art by reference to the following exemplary description and illustrative drawings.

DETAILED DESCRIPTION

Figure 1:
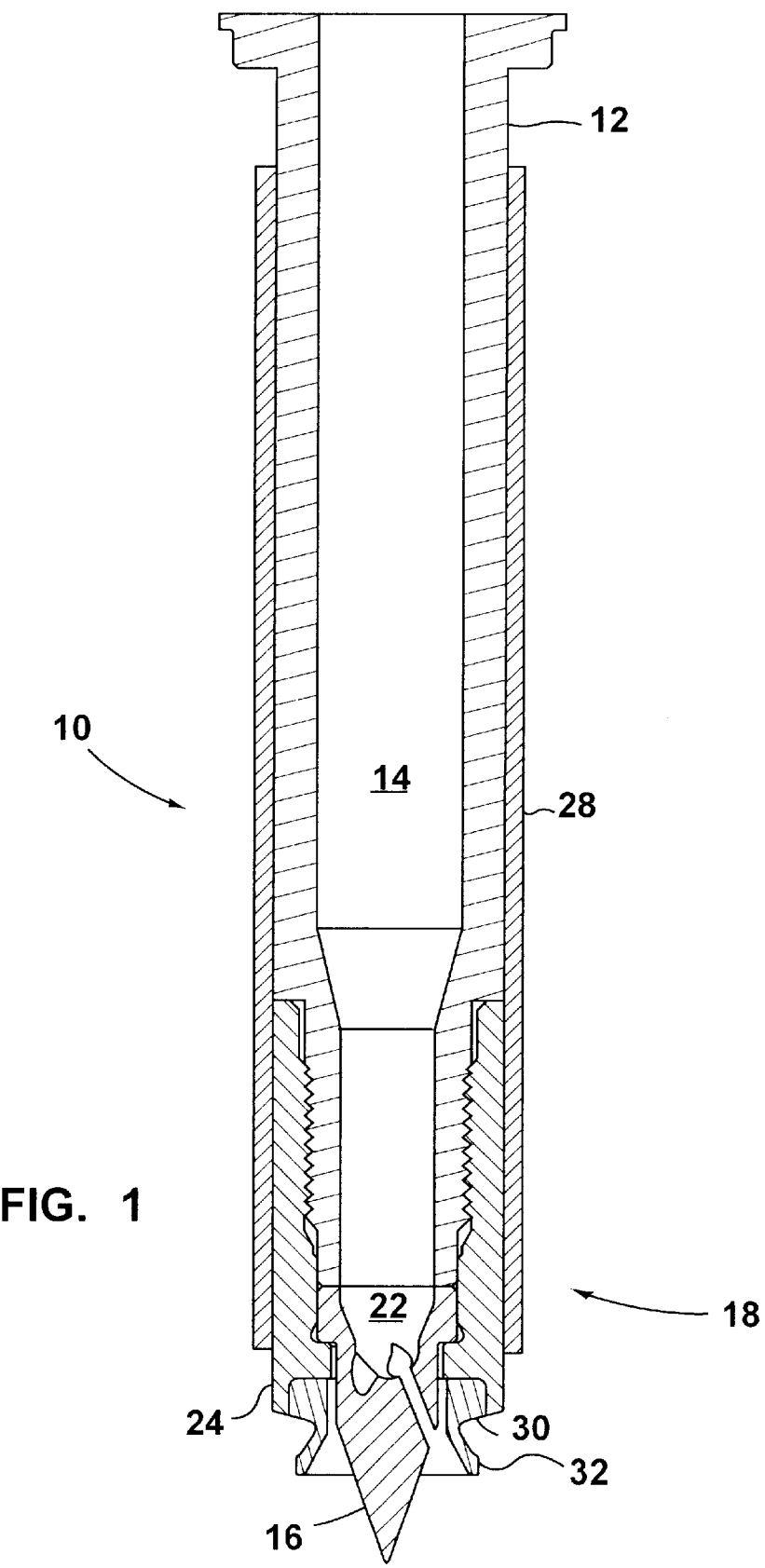
FIG. 1 is a longitudinal cross-sectional view of a preferred embodiment of a nozzle of the present invention wherein a tip retainer is installed externally on the nozzle housing.
Figure 2:
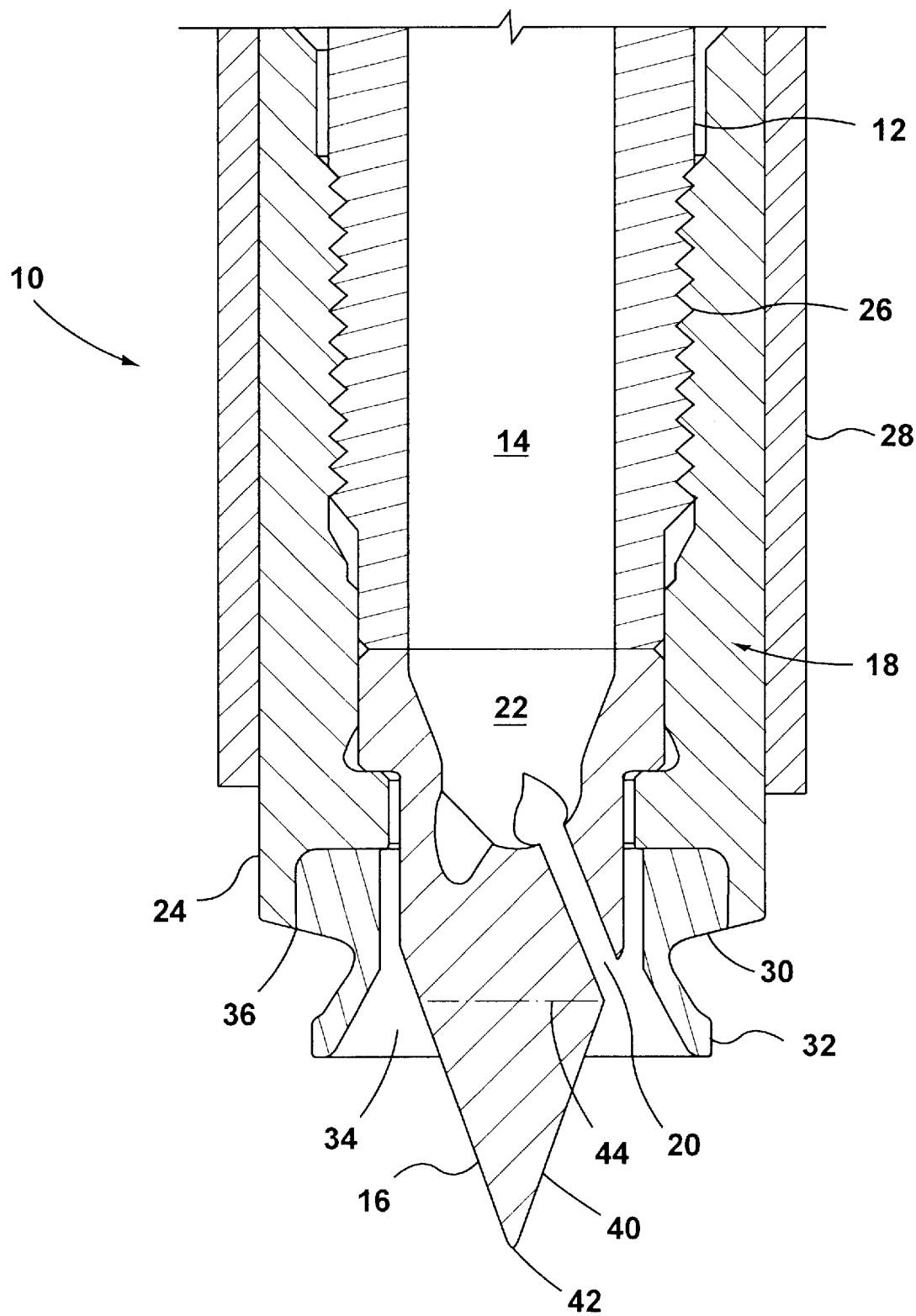
FIG. 2 is a detailed view of a portion of the view of FIG. 1.

Referring to FIGS. 1 and 2, an injection molding nozzle 10 in accordance with a preferred embodiment of the present invention is generally shown. The injection nozzle 10 comprises an elongated nozzle housing 12 having a melt channel 14 therethrough that is in fluid communication with a source of pressurized molten material (not shown) in a well known manner. A nozzle tip 16 is installed at the proximal end 18 of the nozzle housing 12 so that a tip channel 22 formed in nozzle tip 16 is in fluid communication with the melt channel 14 and has at least one outlet aperture 20 in fluid communication with tip channel 22. In a preferred embodiment, nozzle tip 16 is retained at the proximal end 18 of nozzle housing 12 by a tip retainer 24 removably affixed to a proximal end 18 of the nozzle housing by threads 26 or their functional equivalent. Tip retainer 24 is preferably configured to receive and retain a nozzle tip 16 when tip retainer 24 is screwed onto proximal end 18 of nozzle housing 12. In this embodiment, the nozzle housing 12 and tip retainer 24 are constructed, arranged and threaded such that the tip retainer 24 installs on external threads on the nozzle housing 12. In the embodiment shown, the nozzle housing 12 and tip retainer 24 are substantially cylindrical in cross section with substantially equal outside diameters, so that a substantially cylindrical external heater 28 can be installed over nozzle housing 12 and tip retainer 24. Heater 28 supplies heat to nozzle housing 12 and tip retainer 24 to keep the material in melt channel 14 and tip channel 22 molten.

During operation of injection molding nozzle 10, heater 28 directly heats nozzle housing 12 and tip retainer 24 which transfer heat to nozzle tip 16 and the molten material in melt channel 14 and tip channel 22. As discussed above, enough heat must be supplied to nozzle tip 16 to open the gate at the beginning of the injection cycle and keep it open during the injection process. The tip must not be so hot that it does not allow the gate to freeze after packing is complete. Also, as discussed above, the prior art injection molding nozzles accomplish this by making the nozzle tip from highly thermally conductive material, such as beryllium copper. The tip retainer and nozzle seal are made of materials with lower thermal conductivity, such as various stainless and tool steels. The present invention reverses that arrangement so that the tip retainer is significantly more thermally conductive than the tip. In the preferred embodiments, the retainer 24 is made of highly conductive material, such as a beryllium copper alloy made per any of the ASTM C17000 series specifications or a copper alloy made per the C18000 specification, and the nozzle tip 16 is made of less conductive material, such as stainless steel, tool steel or carbide. The retainer will typically have a thermal conductivity in the range of about 100 to 300 $Wm^{-1}K^{-1}$, and the nozzle tip will typically have a range form 10 to 95 $Wm^{-1}K^{-1}$. Use of a nozzle tip having a conductivity in the high end of that range would, according to a preferred embodiment of the present invention, also require the use of a retainer with a conductivity in the high end of its range so that a significant differential, a factor of at least about two, and preferably six or more, in thermal conductivities is achieved. Use of a retainer having a conductivity in the lower end of its range could use a tip with a conductivity at the lower end of its range, provided that the overall operating temperature of the system is high enough to produce good parts without processing the plastic material at too high a temperature. The preferred range for thermal conductivity of the retainer is about 150 to 260 $Wm^{-1}K^{-1}$ with nozzle tips in the range of 25–60 $Wm^{-1}K^{-1}$.

One skilled in the art will appreciate that the materials used for the nozzle tip of the present invention are much more wear-resistant than the beryllium copper used for nozzle tips in the prior art nozzles. Therefore, applications requiring wear-resistant tips can be run with the same tip as those applications not requiring such wear resistance.

Figures 3, 4:
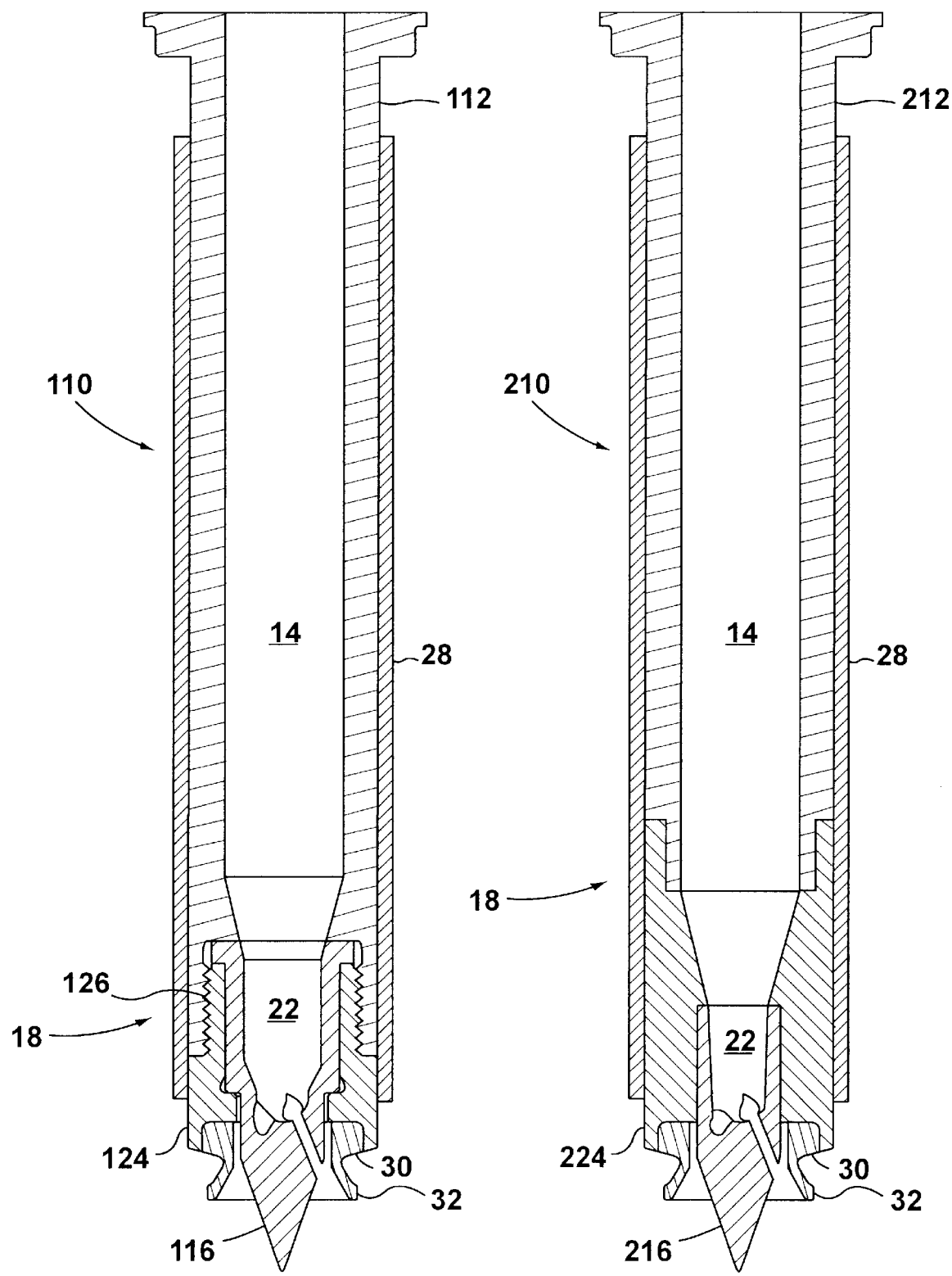
FIG. 3 is a longitudinal cross-sectional view of another preferred embodiment of a nozzle of the present invention wherein a tip retainer is installed internally in the nozzle housing.
FIG. 4 is a longitudinal cross-sectional view of another preferred embodiment of a nozzle of the present invention wherein a tip retainer is brazed to the nozzle housing, and the nozzle tip is attached to the tip retainer with a low-temperature brazing material.

In another preferred embodiment, the tip retainer may thread into internal threads in the nozzle housing. Referring to FIG. 3, which illustrates one such embodiment, in injection nozzle 110 the nozzle housing 112 and tip retainer 124 are configured with internal threads 126 in nozzle housing 112 and mating external threads on tip retainer 124. The tip retainer 124 installs in the internal threads 126 to retain nozzle tip 116.

Referring to FIG. 4, alternatively, in yet another preferred embodiment, the invention can be configured without a removable tip retainer. In injection nozzle 210, the tip retainer 224 could be an integral portion of the nozzle housing 212. When made of a different material then that of the nozzle housing 212, the retainer portion 224 may be welded or brazed with high temperature brazing material to the nozzle housing 212. The nozzle tip 216 could be attached with the tip retainer 224 by brazing with a relatively low-temperature brazing material which would still allow nozzle tip 216 to be removed from tip retainer 224 by reheating the assembly to a temperature high enough to melt the low-temperature brazing material, but not so high as to melt the high temperature brazing material. Alternatively, the nozzle housing 212 and tip retainer 224 could be one integral piece made of the same material. In another example, the tip retainer 224 could have the tip 216 brazed or welded to it, and have tip retainer 224 threadably engage the nozzle housing 212. In still another example, the tip retainer 224 may be removably affixed to the nozzle housing 212 by a low-temperature brazed interface, and tip retainer 224 may be configured to mechanically retain nozzle tip 216 in similar fashion to that of the embodiment of FIG. 1. It must be recognized that for the embodiments requiring brazing, temperatures high enough to melt even the low-temperature brazing material may be high enough to undesirably degrade the material properties of the tip retainer 224.

In either of the embodiments of FIGS. 3 and 4, heater 28 could be an external heater such as that illustrated, or it could be made integral with nozzle housing and tip retainer, as is well known in the art, since the nozzle housing and tip retainer are unitized. The invention encompasses all of those embodiments as well as any other tip/nozzle housing combination wherein the tip is retained against or in the nozzle housing.

In all the embodiments above, optional nozzle seal 30 is affixed to the proximal end of tip retainer 24, 124, or 224, and has a flange 32 which contacts and seals against the mold (not shown). It should be noted, that one of ordinary skill in the art is familiar with a myriad of configurations for nozzle seals and the like that may include a bubble area 34 formed between flange 32 and nozzle tip 16 where molten material is allowed to collect to enhance thermal insulation of the injection nozzle 10 from the mold. The present invention is not limited to the one configuration shown and described herein, but contemplates all known configurations for nozzle seals and the like.

In the embodiments illustrated, nozzle seal 30 is preferably made of a lower thermal conductivity material than tip retainer 24 to minimize heat transfer between the retainer 24 and the mold (not shown). Nozzle seal 30 is preferably also annularly spaced from the nozzle tip 16 to minimize the heat transfer between nozzle seal 30 and nozzle tip 16. The preferred material for nozzle seal 30 is 13-8 tool steel, which has a thermal conductivity of around 14 $Wm^{-1}K^{-1}$. Nozzle seal 30 is preferably fused to tip retainer 24 124, or 224 at interface 36 by electron-beam welding, brazing, or other such process. Alternatively, nozzle seal 30 may be made with a press fit at interface 36, or nozzle seal 30 may threadably engage tip retainer 24, 124, or 224.

Tests have shown that this new retainer/tip combination provides a substantially wider operating window for most plastic resins than with the prior art combinations. Using a prior art Husky ULTRA™ 500 nozzle, with a steel tip retainer 24 and a beryllium copper nozzle tip 16, parts were injection molded with several resins and the temperature of the nozzle changed to determine the operating window. A thermocouple in the tip retainer 24 near the proximal end 18 of nozzle housing 12 monitored the temperature of the nozzle 10, and was a good indicator of the resin processing temperature corresponding to that recommended by the resin manufacturers. As the temperature of the nozzle was adjusted up or down, the gate quality of the parts produced was monitored. The minimum temperature required for the gate to properly open and make good parts was recorded as the minimum temperature for the operating window; and the maximum temperature at which parts would be made without gate stringing was recorded as the maximum temperature for the operating window. All other processing parameters remained constant, with only the nozzle temperature changed. The steel tip retainer and the beryllium copper nozzle tip were then replaced with a beryllium copper tip retainer and a 4140 steel nozzle tip per the present invention and the test was repeated.

Results of these tests are shown in Table 1. For the prior art configuration, the size of the operating window ranged from a low of 30 degrees Celsius (C.) for polypropylene to a high of 100 degrees Celsius for high-density polyethylene. With a configuration of the present invention, the size of the operating window for polypropylene increased to 205 degrees Celsius, and the operating window for high-density polyethylene increased to 260 degrees Celsius. The configuration of the present invention lowered the minimum temperature and substantially raised the maximum temperature of the operating window. In fact, good parts were still being made without gate stringing with the nozzle at 400 degrees Celsius. Testing at higher temperatures was not done because the beryllium copper retainer anneals, and thereby looses strength, at temperatures over 400 degrees Celsius.

TABLE 1

| Resin | Operating Window for Nozzle with Prior Art steel retainer and BeCu tip insert | Operating window for Nozzle with present invention BeCu retainer and 4140 steel tip insert |
|---|---|---|
| Polypropylene | 205–235° C. | 195–400° C. |
| Polycarbonate | 300–340° C. | 285–400° C. |
| HDPE | 180–280° C. | 140–400° C. |
| Nylon | 280–320° C. | 270–350° C. |

With the configuration of the present invention, the highly thermally conductive tip retainer 24 transfers heat from heater 28 and nozzle housing 12 to the nozzle tip 16 better than with the prior art configuration wherein the tip retainer is made of steel and only the small tip is made of high thermal conductivity material. The larger mass of high thermal conductivity material in the tip retainer 24 puts more heat closer to the gate, thereby keeping the plug of frozen resin that is formed at the gate thin enough so that the gate can open at a lower minimum operating temperature. This is seen in Chart 1 which shows a steady-state thermal analysis of the temperature along nozzle tip 16 for the configurations used to produce the results of Table 1.

processing temperature window is the reaction of the nozzle tip 16 to the transient condition of shear heating of the molten material as it flows through tip 16. Compared to materials used for prior art tips, the materials used for the tip 16 of the present invention have relatively high density and low thermal conductivity, and do not respond as greatly or as rapidly to the shear heating of the molten material during injection of the molten material. This keeps the tip at a lower temperature immediately after the injection portion of the molding cycle, which reduces likelihood of gate stringing. Good parts can, therefore, be made without gate stringing even when nozzle temperatures are at their structural upper limit.

The same test was also performed using larger nozzles (Husky's ULTRA™ 750, and ULTRA™ 1000) and similar results were obtained.

Figure 6:
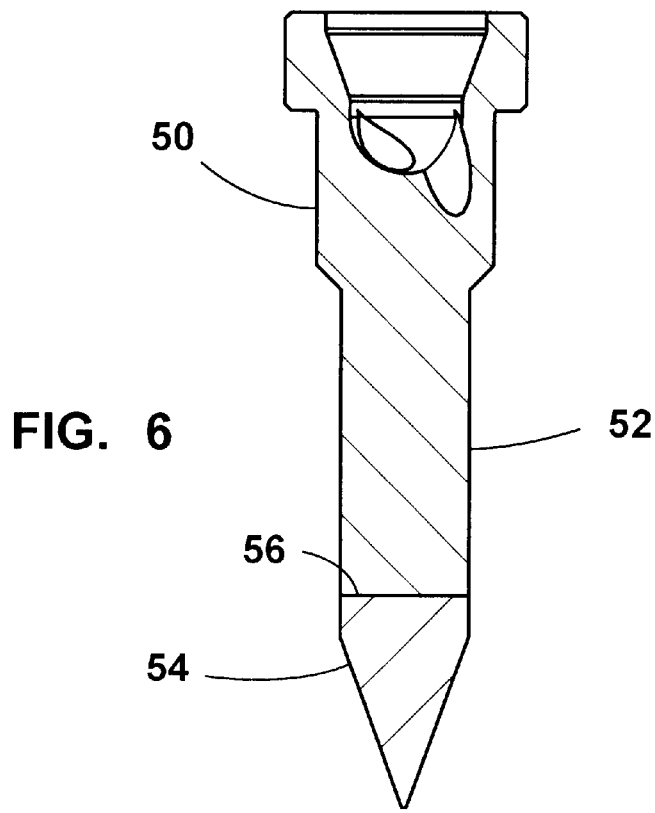
FIG. 6 is a longitudinal cross section of the extended nozzle tip of FIG. 5.
Figure 5:
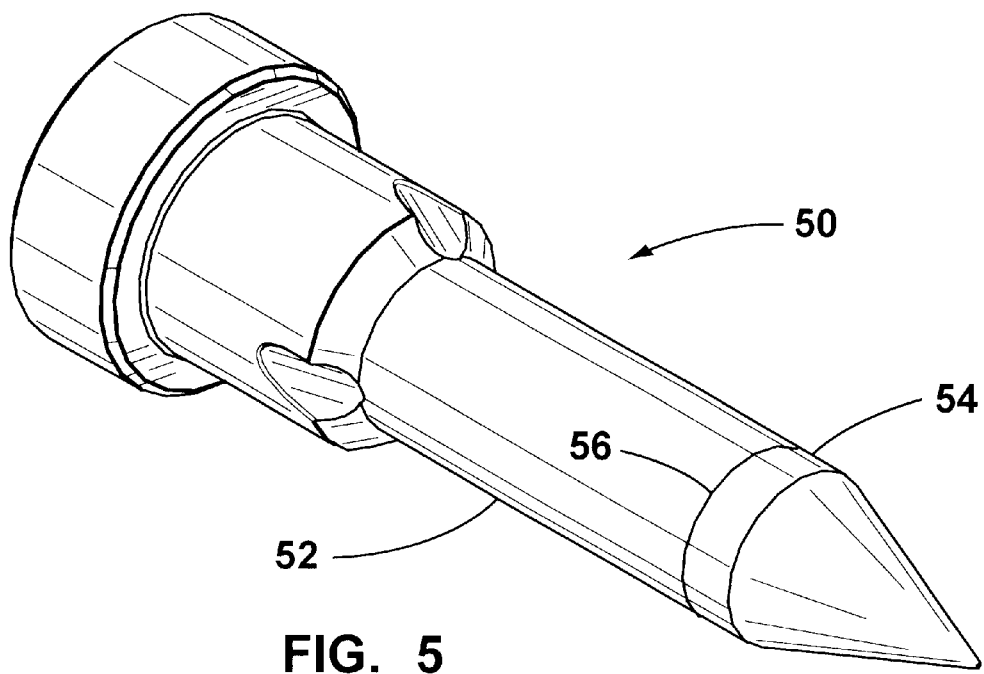
FIG. 5 is an isometric view of an extended nozzle tip.

For all the tests, nozzle tip 16 was a length used for most applications. For some applications, an extended length tip is needed. For these applications, the low thermal conductivity of nozzle tip 16 may be insufficient to provide enough heat at the conical portion if the entire nozzle tip 16 is made of low thermal conductivity material. For these applications, an extended tip can be made as shown in FIGS. 5 and 6. The extended tip 50 has a shank portion 52 and an end portion 54 that extends from the shank portion 52. The relationship between thermal conductivities for the shank portion 52 and the end portion 54 are preferably about the same as that for the tip retainer 24 and the tip 16 respectively. The shank portion 52 is formed of material that is significantly more thermally conductive, such as beryllium copper, than the material, such as stainless or tool steel, forming the end

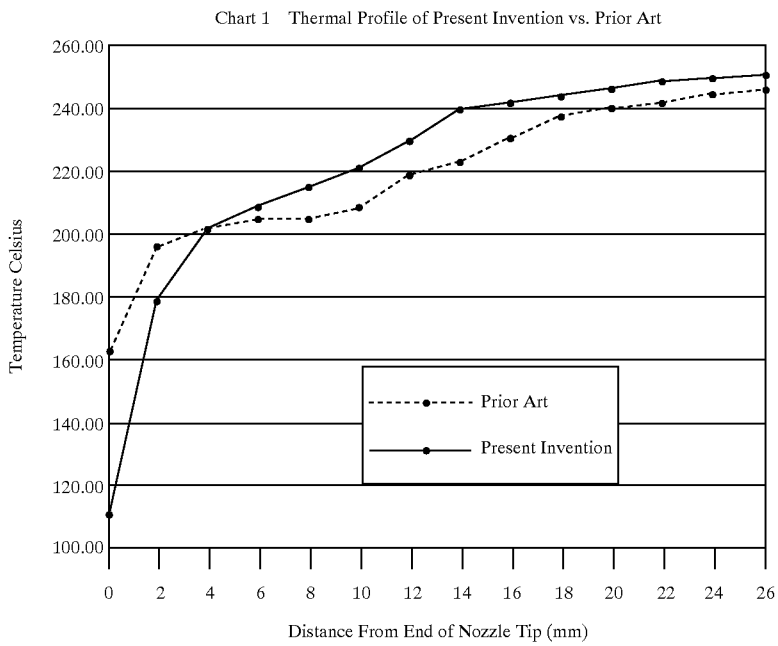

Chart 1  Thermal Profile of Present Invention vs. Prior Art

Since the nozzle tip 16 is made of fairly low thermal conductivity material, the temperature of the tip along conical portion 40 falls rapidly to the end 42 of the nozzle tip 16. The portion from the end 42 to 4 mm from the end, indicated by line 44, is colder than the same area for the prior art tip. This causes the portion of the present invention nozzle tip 16 located in the gate to be much colder than that of a prior art tip. The relatively cold tip at the gate allows for proper freezing of the gate, even with very high nozzle operating temperatures. Another factor that influences the portion 54. The length of end portion 54 is preferably approximately one to two times the diameter of shank portion 52. Portions 52 and 54 are preferably fused, such as by electron beam welding, at their interface 56.

When operating within the window, an injection molding process has a cycle time which greatly depends on how long the gate takes to freeze. With more heat at the end of the nozzle tip, more heat must be dissipated into the mold, thereby requiring longer time to freeze the gate and thus making longer cycle times. The colder end 42 of the nozzle tip 16 of the present invention allows cycle times to be reduced two ways. First, the colder tip end 42 lets gates freeze sooner by (1) transferring less heat to the tip end 42, heat which must be removed by the mold to freeze the gate, and (2) by providing greater temperature differential between the tip end and the plastic adjacent to it to cool the plastic faster. Second, because the lower limit of the operating window with the present invention is lower than that of the prior art nozzles, the overall processing temperature of the injection molding system can be reduced. With plastic at a cooler temperature, it freezes faster in the mold and the gate, which can significantly reduce cycle times.

It will, of course, be understood that the above description has been given by way of example only and that modifications in detail may be made within the scope of the present invention. For example, it will be readily appreciated that the nozzle tip can equally find application in a cold runner system.

What is claimed is:

1. A nozzle for an injection molding runner system, comprising:
   a nozzle housing having a melt channel through it;
   a nozzle tip having a tip channel and at least one outlet aperture in communication with the tip channel; and
   a tip retainer that retains the nozzle tip against the nozzle housing such that the tip channel communicates with the melt channel, the tip retainer being significantly more thermally conductive than the nozzle tip.

2. The nozzle of claim 1, wherein the tip retainer is removably affixed to the nozzle housing.

3. The nozzle of claim 2, wherein the tip retainer is removably affixed to the nozzle housing by one of:
   threads; and
   low-temperature brazing.

4. The nozzle of claim 1, wherein the nozzle tip has a thermal conductivity, and the tip retainer has a thermal conductivity that is at least about twice the thermal conductivity of the nozzle tip.

5. The nozzle of claim 4, wherein the thermal conductivity of the tip retainer is in a first range of between about 100 to 300 $Wm^{-1}K^{-1}$ and the thermal conductivity of the nozzle tip is in a second range of between about 10 and 95 $Wm^{-1}K^{-1}$.

6. The nozzle of claim 4, wherein the thermal conductivity of the tip retainer is in a first range of between about 150 to 260 $Wm^{-1}K^{-1}$ and the thermal conductivity of the nozzle tip is in a second range of between about 25 and 60 $Wm^{-1}K^{-1}$.

7. The nozzle of claim 1, wherein the nozzle tip is retained in the tip retainer by low-temperature brazing.

8. The nozzle of claim 1, further comprising a nozzle seal affixed to the tip retainer.

9. The nozzle of claim 8, wherein the nozzle seal is significantly less thermally conductive than the tip retainer.

10. The nozzle of claim 9, wherein the nozzle seal is affixed to the tip retainer by one of either welding or brazing.

11. The nozzle of claim 9, wherein the nozzle seal is annularly spaced from the nozzle tip.

12. The nozzle of claim 1, further comprising a heater installed on the nozzle housing, the heater, in use, heating the nozzle housing and tip retainer.

13. The nozzle of claim 12 wherein the heater is substantially cylindrical and is installed over the nozzle housing.

14. The nozzle of claim 1, wherein the nozzle tip has a shank portion and an end portion extending from the shank portion, the shank portion being significantly more thermally conductive than the end portion.

15. The nozzle of claim 14, wherein the shank portion has a diameter, and the end portion has a length that is approximately one to two times the diameter of the shank portion.

16. The nozzle of claim 14, wherein the thermal conductivity of the shank portion is in a first range of between about 100 to 300 $Wm^{-1}K^{-1}$ and the thermal conductivity of the end portion is in a second range of between about 10 and 95 $Wm^{-1}K^{-1}$.

17. The nozzle of claim 14, wherein the thermal conductivity of the shank portion is in a first range of between about 150 to 260 $Wm^{-1}K^{-1}$ and the thermal conductivity of the end portion is in a second range of between about 25 and 60 $Wm^{-1}K^{-1}$.

18. The nozzle of claim 1, wherein the runner system is a hot-runner system.

19. A nozzle for an injection molding system, comprising:
   a nozzle housing having a melt channel through it;
   a nozzle tip having a tip channel and at least one outlet aperture in communication with the tip channel; and
   a tip retainer attached to the nozzle housing, the tip retainer retaining the nozzle tip against the nozzle housing such that the tip channel communicates with the melt channel;
   wherein:
      a) the tip retainer is manufactured substantially if not entirely from one of:
         i) beryllium copper alloy made according to any of the ASTM C17000 series specifications; and
         ii) a copper alloy made according to the ASTM C18000 specification;
      b) the nozzle tip is manufactured substantially if not entirely from one of:
         i) stainless steel;
         ii) tool steel; and
         iii) carbide.

20. A nozzle for an injection molding hot runner system, comprising:
   a nozzle housing having a melt channel through it and a proximal end with threads;
   a nozzle tip having a tip channel and at least one outlet aperture in fluid communication with the tip channel;
   a tip retainer having threads that engage the threads of the nozzle housing so that the tip retainer is removably attached to the nozzle housing and retains the nozzle tip against the nozzle housing such that the tip channel communicates with the melt channel, the tip retainer being formed of a material that is significantly more thermally conductive than the material forming the nozzle tip; and
   a nozzle seal fused to the tip retainer, the nozzle seal being formed of a material that is significantly less thermally conductive than that forming the tip retainer.

* * * * *